(12) United States Patent
Martin et al.

(10) Patent No.: US 7,762,291 B2
(45) Date of Patent: Jul. 27, 2010

(54) CAPLESS CLOSURE ASSEMBLY AND METHOD FOR FUEL TANK FILLER

(75) Inventors: Charles J. Martin, Dexter, MI (US); Carl F. Binder, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 1027 days.

(21) Appl. No.: 11/406,168

(22) Filed: Apr. 18, 2006

(65) Prior Publication Data

US 2006/0237472 A1      Oct. 26, 2006

Related U.S. Application Data

(60) Provisional application No. 60/672,940, filed on Apr. 19, 2005.

(51) Int. Cl.
*B65B 1/04*    (2006.01)
*B65B 3/00*    (2006.01)

(52) U.S. Cl. ................. 141/350; 141/348; 141/302; 220/86.2

(58) Field of Classification Search ............. 141/301, 141/302, 348–350; 220/86.2
See application file for complete search history.

(56) References Cited

U.S. PATENT DOCUMENTS

| | | | |
|---|---|---|---|
| 2,145,758 A | | 1/1939 | Fellows |
| 5,163,473 A | | 11/1992 | Strnad, Jr. et al. |
| 5,435,358 A | | 7/1995 | Kempka |
| 5,465,861 A | * | 11/1995 | Kunz et al. ............... 220/260 |
| 5,730,194 A | | 3/1998 | Foltz |
| 5,732,842 A | | 3/1998 | Krause |
| 5,908,130 A | * | 6/1999 | Chang .................... 220/254.4 |
| 6,009,920 A | | 1/2000 | Palvoelgyi |
| 6,092,685 A | | 7/2000 | Gruber |
| 6,155,316 A | | 12/2000 | Benjey |
| 6,539,990 B1 | | 4/2003 | Levey |
| 6,994,130 B1 | * | 2/2006 | Gabbey et al. .............. 141/371 |
| 7,007,726 B1 | | 3/2006 | Martin |
| 7,165,583 B1 | * | 1/2007 | Walkowski et al. ......... 141/350 |
| 7,318,462 B2 | * | 1/2008 | Ganachaud ................. 141/350 |

FOREIGN PATENT DOCUMENTS

| | | |
|---|---|---|
| DE | 41 32 056 A1 | 4/1993 |
| DE | 199 35 454 A1 | 3/2001 |
| EP | 0 602 440 A | 6/1994 |

(Continued)

OTHER PUBLICATIONS

PCT Search Report, PCT PCT/IB2006/000902 search completed Jul. 24, 2006.

*Primary Examiner*—Timothy L Maust
(74) *Attorney, Agent, or Firm*—Anna M. Shih (57) ABSTRACT

A capless closure assembly for a fuel tank filler tube has a housing adapted for covering a bulkhead with an opening disposed on a proximal end of the filler tube, a sliding element disposed in the housing, and a door that is biased to close an aperture in the housing. The sliding element is movable between a first position that exposes the opening in the bulkhead and a second position that covers the opening in the bulkhead, and the door cooperates with the sliding element to move the sliding element from the second position to the first position as the door is opened.

17 Claims, 6 Drawing Sheets

FOREIGN PATENT DOCUMENTS

| | | |
|---|---|---|
| EP | 1 329 353 A | 7/2003 |
| EP | 1 452 378 A | 9/2004 |
| JP | 2002 166732 A | 6/2002 |
| WO | WO 00/69722 A | 11/2000 |
| WO | WO 03/086805 A | 10/2003 |

* cited by examiner

CAPLESS CLOSURE ASSEMBLY AND METHOD FOR FUEL TANK FILLER

RELATED APPLICATIONS

This application claims the benefit of U.S. Provisional Application No. 60/672,940, filed Apr. 19, 2005 entitled "Capless Closure Assembly and Method For Fuel Tank Filler", which is incorporated herein by reference in its entirety.

TECHNICAL FIELD

The present invention relates to a capless closure for a fuel tank filler assembly.

BACKGROUND

Presently mandated requirements for controlling fuel vapor emissions in motor vehicle fuel tank systems require an onboard diagnostic (OBD) test be run periodically during the vehicle service life to determine whether the fuel system is vapor tight or whether fuel vapor is permeating to the atmosphere. Such OBD systems widely employ a sequence whereby a slight vacuum is drawn in the fuel tank and vapor emission control system and the rate of vacuum loss measured to determine whether a prohibitive amount of leakage is present in the system.

Vehicles equipped with such OBD systems have been found to experience widespread problems in service with leakage through the user removable fuel tank filler tube cap. The most common types of problems are improper placement of the fuel filler cap by the user after refueling and failure of the cap seal on the filler tube which is attributable to friction and wear after multiple refueling operations.

In order to provide a fuel tank filler system without the conventional user removable cap, it has been required to provide a fuel vapor tight seal mechanism in the filler tube to prevent fuel vapor emission to the atmosphere upon completion of refueling. Thus, a latchable flapper valve has been proposed and such an arrangement is shown and described in co-pending and commonly-assigned application Ser. No. 11/047,201 filed Jan. 31, 2005 entitled: "Door Latch For Capless Filler Neck", in the name of Paul D. Walkowski, et al., which describes such a releasable latch mechanism for the flapper door. However, where such a releasable latching mechanism has been proposed for a fuel filler tube flapper valve, it has been desired to provide a permanently installed protective cover which will accommodate the insertion of a refueling nozzle without the need for a user removable cap.

There is a desire for a structure that closes and seals a fuel tank filler tube without requiring a user-removable cap. There is also a desire for a structure that is easy to manufacture and install on the fuel tank filler tube and that is robust and reliable in service and sufficiently compact to fit in the limited space allotted for the filler tube in the vehicle body structure behind the outer fuel filler door.

SUMMARY OF THE INVENTION

The present invention is directed to a capless closure assembly for a fuel tank filler tube. The assembly has a housing adapted for covering a bulkhead with an opening disposed on a proximal end of the filler tube, a sliding element disposed in the housing, and a door that is biased to close an aperture in the housing. The sliding element is movable between a first position that exposes the opening in the bulkhead and a second position that covers the opening in the bulkhead, and the door cooperates with the sliding element to move the sliding element from the second position to the first position as the door is opened.

DETAILED DESCRIPTION

Figure 1:
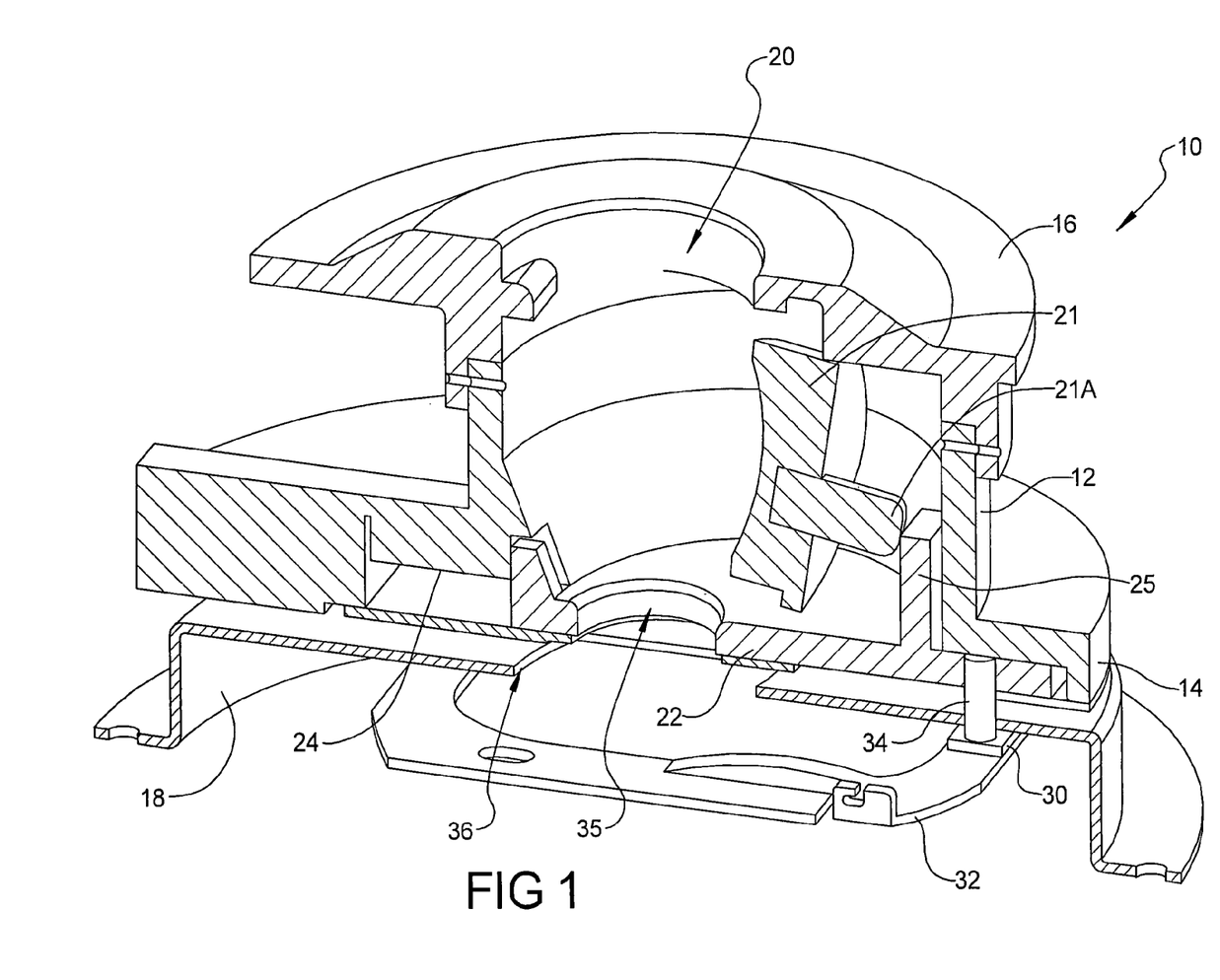
FIG. 1 is a perspective section view of an assembly according to one embodiment of the invention with the door in an open position.
Figure 2:
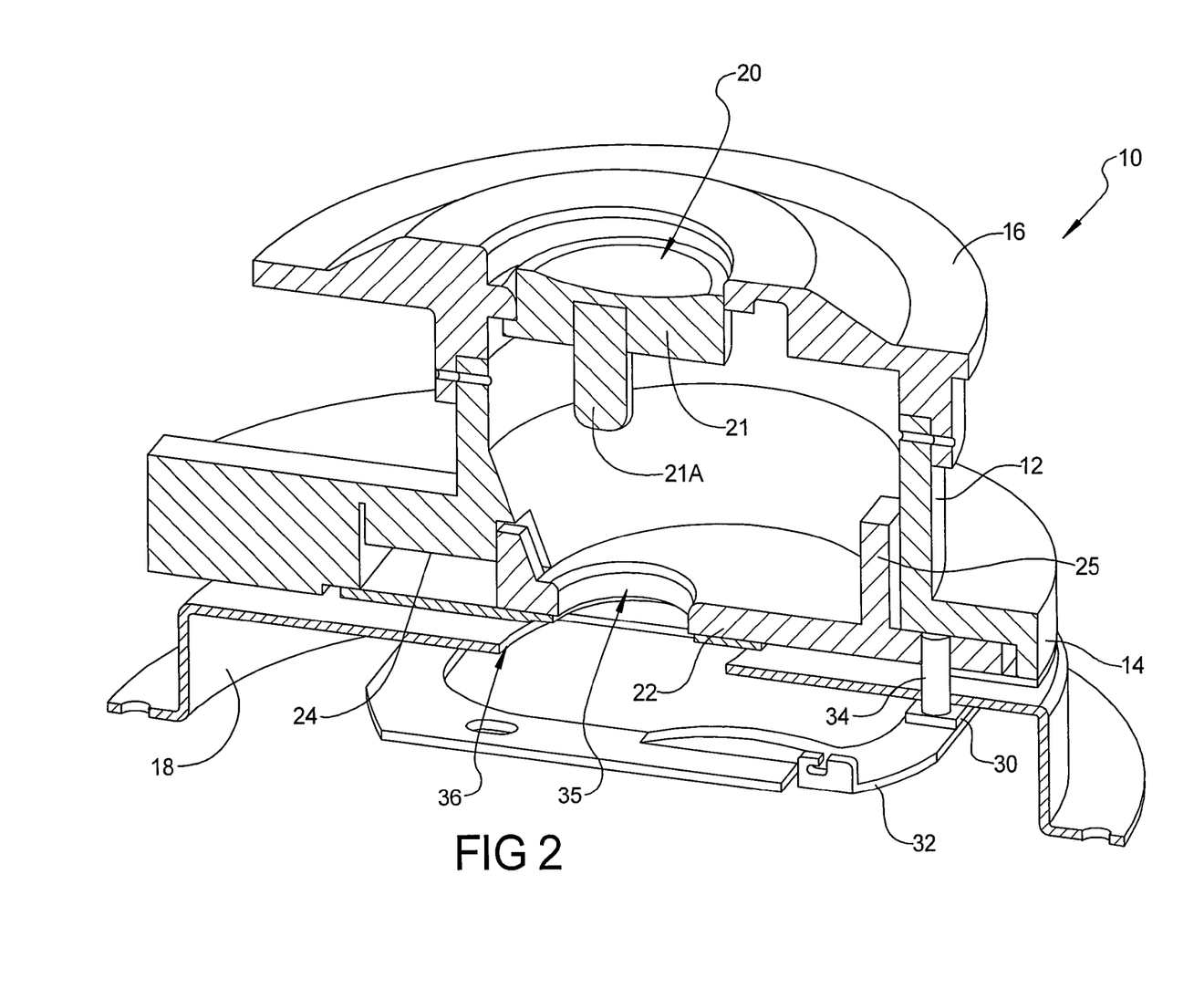
FIG. 2 is a representative side section view of the assembly in FIG. 1 with the door in a closed position.
Figure 3:
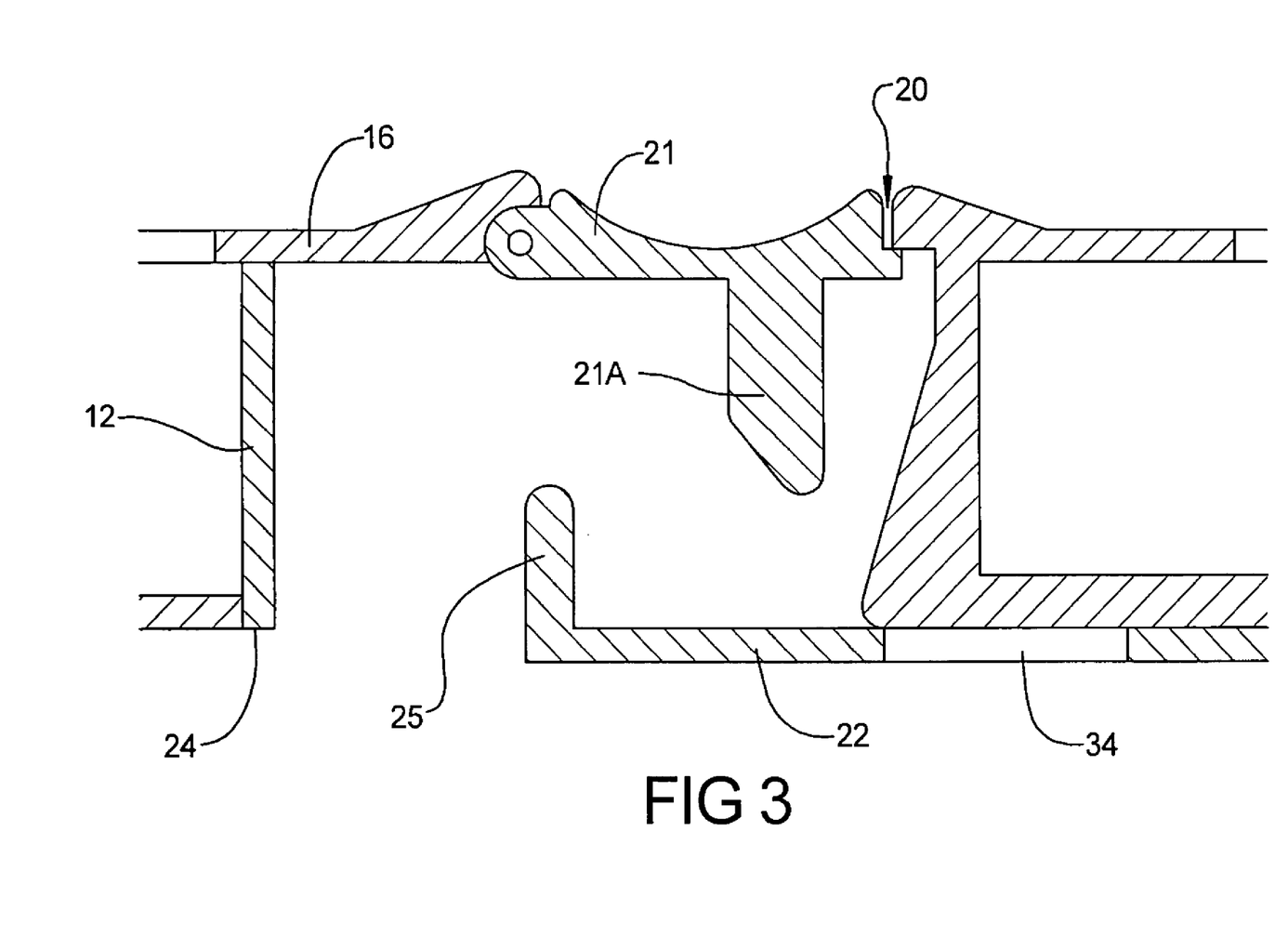
FIG. 3 is a representative side section view of the assembly in FIG. 1 with the door pushed to the open position by a refueling nozzle.

The invention, examples of which are described in greater detail below, generally convert the motion of a refueling nozzle as it is inserted into the filler neck into a translational motion that can operate a sliding latch for a spring-biased door that seals the filler tube. Referring to FIGS. 1 through 3, a closure assembly 10 according to one embodiment of the invention includes a housing 12 that has a lower mounting flange 14 extending peripherally thereabout and radially outwardly therefrom and an upper flange 16 which is adapted for interfitting with the access opening for the fuel filler door on the vehicle body structure.

The lower mounting flange 14 is adapted for and is shown in the drawings as mounted on a bulkhead or partition 18 which it will be understood is permanently attached transversely to the proximal end of the fuel tank filler tube (not shown) by any suitable technique, such as via welding. In the present practice, the lower mounting flange 14 of the assembly 10 may be secured to the bulkhead 18 by any suitable expedient as, for example, fasteners (not shown) or by adhesive bonding. In the present practice the housing 12 is formed of a suitable structurally robust material which has resistance to fuel permeation such as high density polyethylene (HDPE) with interspersed barrier materials such as polyamide or ethylene vinyl alcohol (EVOH).

In the present practice, the housing 12 with its lower flange 14 are formed integrally as one piece; and, the upper flange 16 is formed as a cap that is attached over the housing 12.

The flanged cap 16 is attached to the housing 12 by any suitable expedient such as adhesive bonding or welding. The flanged cap 16 has a nozzle receiving aperture 20 formed therein that is sized to provide a clearance for a fuel dispensing nozzle as will hereinafter be described. A door 21 is hingedly attached to the flanged cap and is biased to close the nozzle receiving aperture 20. Pushing the tip of a refueling nozzle against the door 21 will open the door and allow the refueling nozzle to enter the assembly 10. A projection 21a extends from the underside of the door 21.

A sliding element 22 is received in the housing and guided for sliding movement therein by a groove or recess 24 formed in the undersurface of flange 14. A cam surface 25 extends upwardly from the sliding element 22 and is positioned to contact the projection 21a on the door 21 when the door 21 starts to open.

The bulkhead 18 has an access opening 30, and a sliding latch plate 32 or other auxiliary element is disposed beneath the bulkhead 18. The sliding latch plate 32 includes a projection 34 that projects through the access opening 30 and engages with the sliding element 22. The projection 32 allows an auxiliary function such as, for example, release of a flapper door latch mechanism (not shown) to occur when the sliding element 22 moves. Although the figures show a sliding latch plate as the auxiliary element that performs release of a door latch as the auxiliary function, those of ordinary skill in the art will understand that other auxiliary elements and functions may be incorporated into the assembly 10 without departing from the scope of the invention.

Figure 4:
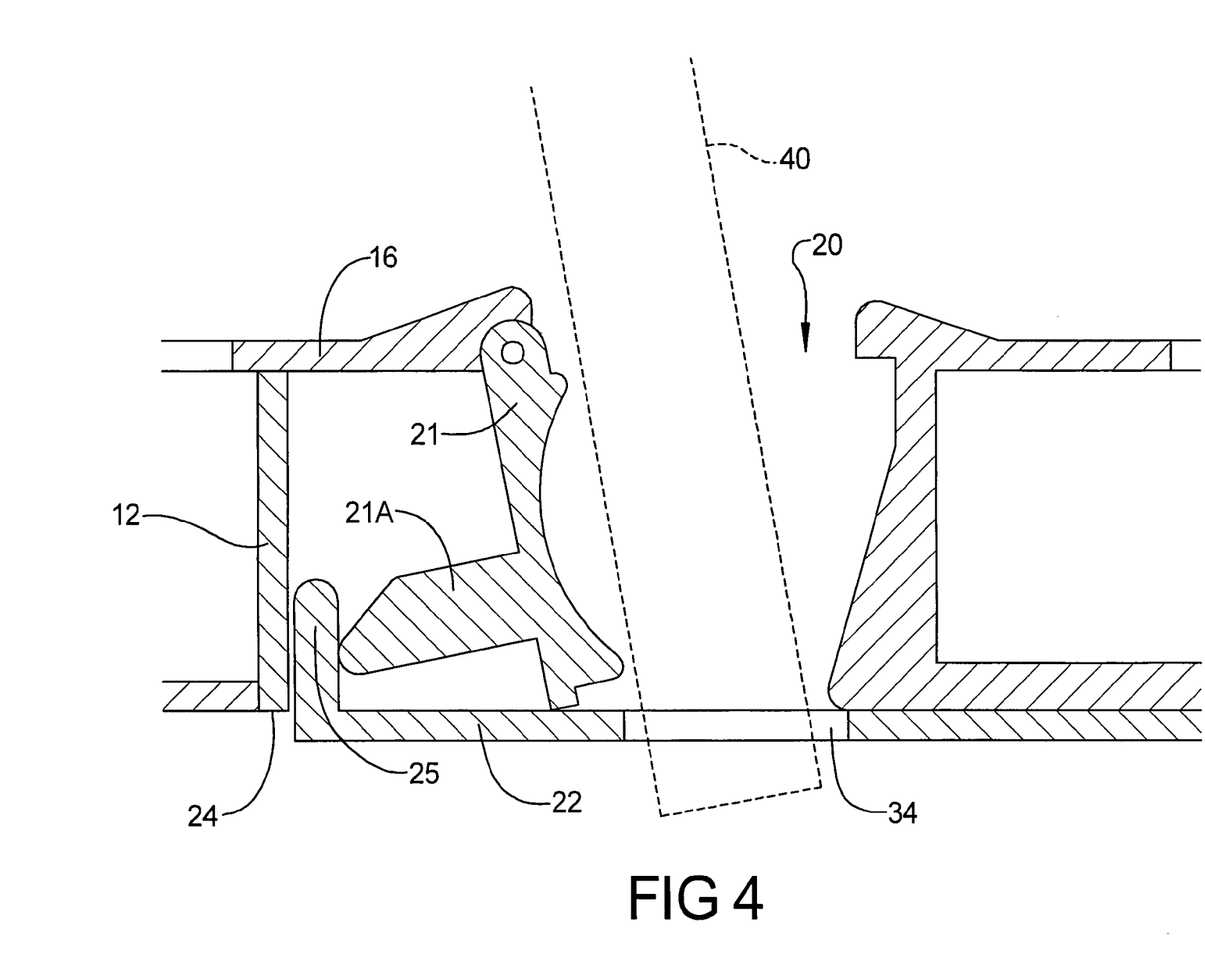
FIG. 4 is a representative side section view of an assembly according to another embodiment of the invention with the door pushed to the open position by a refueling nozzle.

The sliding element 22 has a nozzle receiving hole 35. As shown in FIGS. 2 and 4, the nozzle receiving hole 35 is offset from a nozzle receiving opening 36 formed in the bulkhead 18 so that the opening 36 in the bulkhead 18 is normally closed by the sliding element 22. In this closed state, the door 21 is closed as well.

FIGS. 1 and 3 shows a fuel dispensing nozzle 40 in dashed outline to illustrate the operation of the assembly 10 when it is opened by the nozzle 10. The nozzle 40 is pressed against the door 21 until it opens, allowing the nozzle to enter the aperture 20 in the flanged cap 16. As the door 21 continues to open, the projection 21a on the door contacts the cam surface 25 on the sliding element 22, which pushes the sliding element 22 until the nozzle receiving hole 35 in the sliding element 22 aligns with the opening 36 in the bulkhead 18. With the opening 36 and the receiving hole 35 aligned, the nozzle 40 can be completely inserted into the filler neck.

Moreover, the projection 34 on the sliding latch plate 32, which is engaged with the sliding element 22, moves along with the sliding element 22 to perform its auxiliary function (e.g., releasing a door latch for a flapper door seal in this example).

Figure 5:
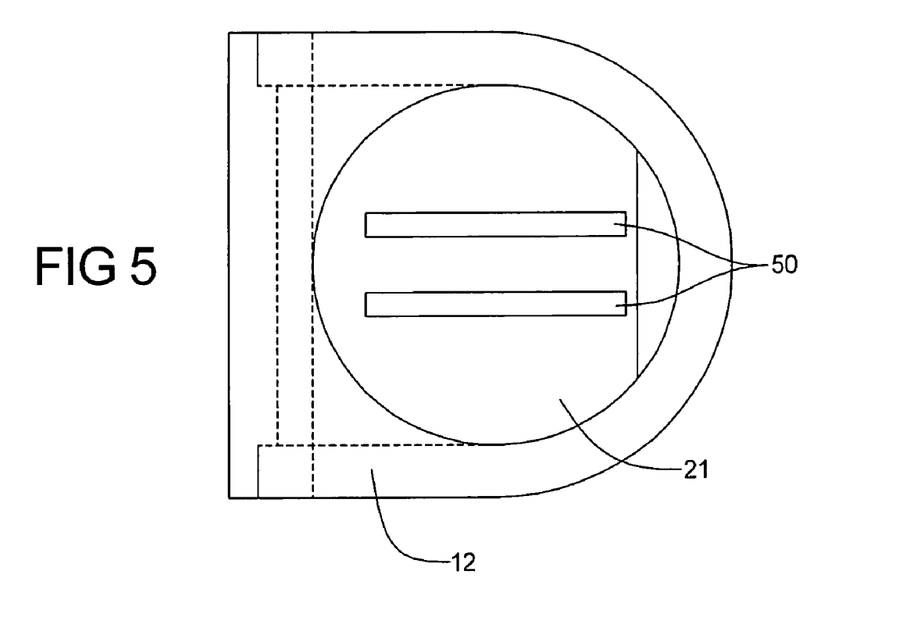
FIG. 5 is a representative top view of an assembly according to another embodiment of the invention.
Figure 6:
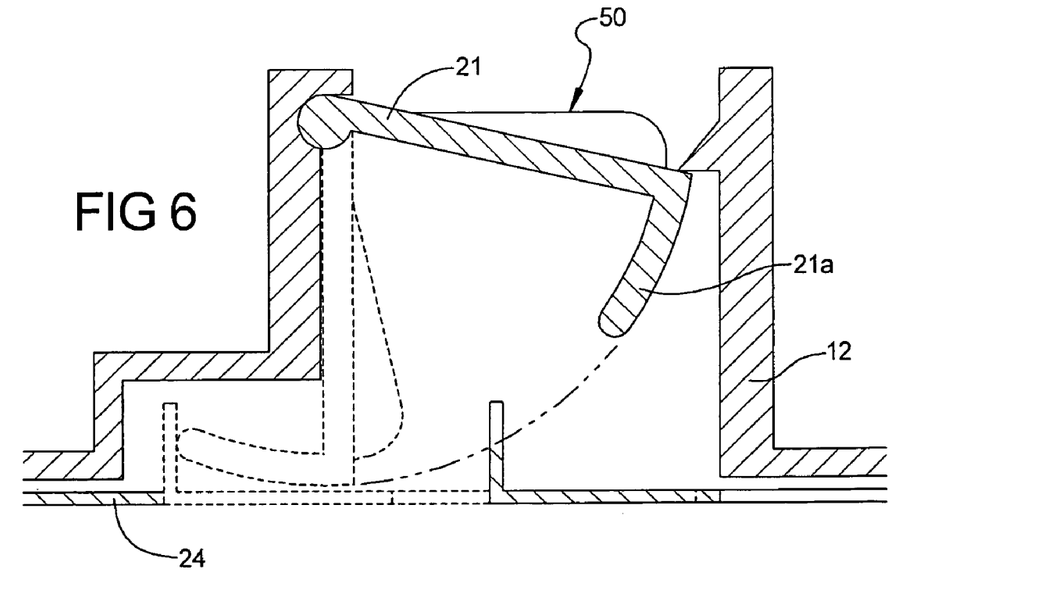
FIG. 6 is a representative side section view of the assembly of FIG. 5.

FIGS. 5 and 6 illustrate another embodiment of the invention. Only the door 21, a portion of the flanged cap 16, and the sliding element 22 are shown for simplicity; other components of the invention remain the same. In this illustrated example, the projection 21a on the door 21 is moved to a slightly different position so that the door 21 and projection 21a are shaped like a paddle. The general operation of the door 21 and the sliding element 22 in this embodiment are the same as described above. In this embodiment, two raised fins 50 are placed in a spaced relationship on top of the door 21. The fins 50 act as a fuel nozzle discriminator so that an unleaded fuel nozzle will fit between the fins 50 but a diesel fuel nozzle will not.

Figure 7:
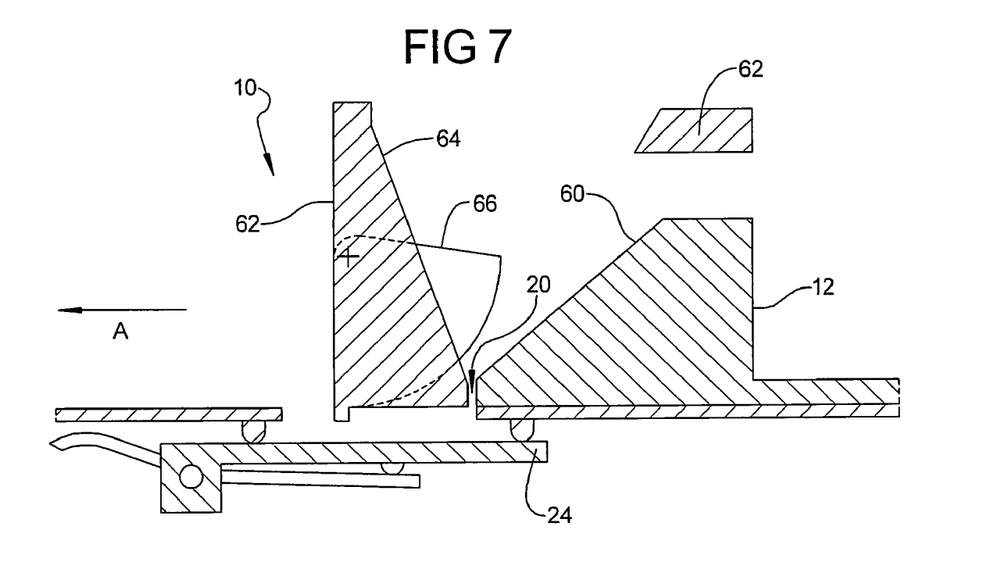
FIG. 7 is a representative side section view of an assembly according to another embodiment of the invention.

FIG. 7 is a representative side section view of an assembly 10 according to another embodiment of the invention. In this embodiment, the housing 12 is configured to have a first ramp 60, and a moving cup 62 having a second ramp 64 act as the sliding element. Also, the door 21 in this embodiment is configured to be below the sliding element (i.e., the movable cup 62). The first ramp 60 and the second ramp 64 are configured so that when the refueling nozzle is inserted into the moving cup 62, it slides against the first and second ramps 60, 64 such that the moving cup 62 slides in the direction marked by arrow A to expose the nozzle receiving aperture 20 of the housing 12 and the door 21. Continued insertion of the nozzle pushes open the door 21.

The embodiment shown in FIG. 7 may also include a latch 66, such as a rotating latch that rotates in the direction shown by arrow B, that locks the moving cup 62 in place until a nozzle presses the latch 66 open. This ensures that the moving cup 62 will stay in the closed position even under impact and will open only when the nozzle is inserted into the cup 62.

Figure 8:
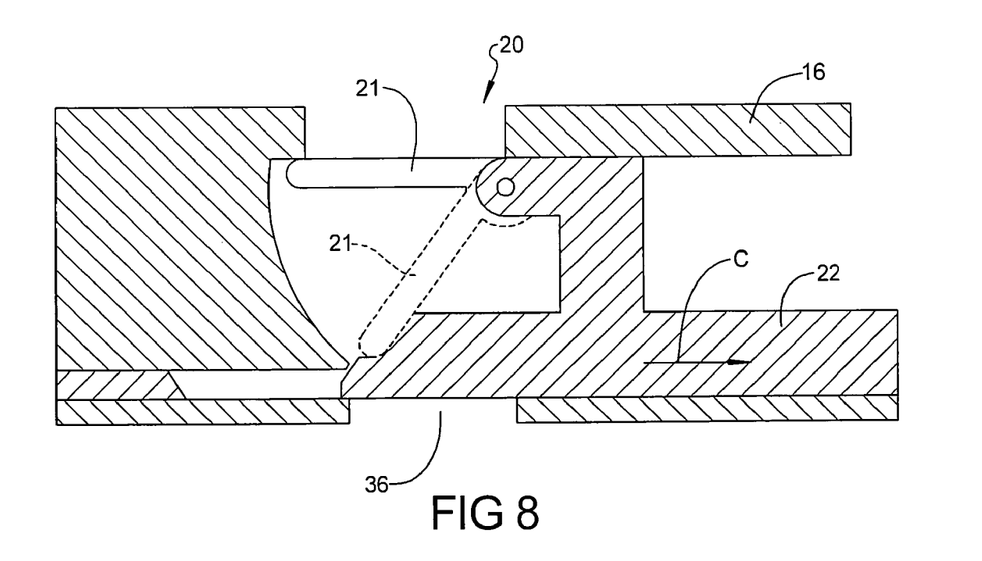
FIG. 8 is a representative side section view of an assembly according to yet another embodiment of the invention.

FIG. 8 is a representative side section view of an assembly according to yet another embodiment of the invention. In this embodiment, the sliding element 22 does not have a hole. Instead, it has a notch 52 that is contoured to fit against the door 21 when the door 21 is pushed open. FIG. 8 shows the closed door 21 in dotted lines and the open door 21 in solid lines, with the sliding element 22 in the closed position door 21 in this embodiment is attached to the sliding element 22 rather than the housing 12. As a result, when the nozzle is inserted into the assembly 10, the door 21 moves downward until it contacts the notch 52 to form a ramp. As the nozzle continues to be inserted, it pushes against the ramp formed by the door 21 to slide the sliding element 22 into the recess 24 (i.e., in the direction shown by arrow C in the figure) until the opening 36 in the bulkhead 18 is exposed.

The present specification, drawings and claims have described an exemplary embodiment of a closure assembly for a capless fuel filler neck or tube which is operative upon insertion of a refueling nozzle to have the nozzle contact a cam surface and move a sliding element to align a nozzle receiving opening in the sliding element with a nozzle positioning aperture in the bulkhead or partition provided on the fuel filler tube. The sliding element includes a projection thereon operative for performing an auxiliary function such as releasing a flapper door seal latch mechanism.

It will be understood that modifications and variations may be made to the above-described exemplary embodiment within the scope of the following claims.

What is claimed is:

1. A capless closure assembly for a fuel tank filler tube, comprising:
    a housing adapted for covering a bulkhead with an opening disposed on a proximal end of the filler tube;
    a sliding element disposed in the housing, wherein the sliding element is movable in a linear, non-rotating fashion between a first position that exposes the opening in the bulkhead and a second position that covers the opening in the bulkhead; and
    a door that is biased to close an aperture in the housing, wherein the door cooperates with the sliding element as the door rotates to an open position to move the sliding element from the second position to the first position.

2. The assembly of claim 1, wherein the sliding element has a hole that is aligned with the opening in the bulkhead when in the first position and that is offset from the opening in the bulkhead when in the second position.

3. The assembly of claim 1, further comprising a projection on the door that cooperates with the sliding element.

4. The assembly of claim 1, further comprising a cam surface on the sliding element, wherein the cam surface cooperates with the door.

5. The assembly of claim 4, wherein the door is connected to the sliding element and the cam surface is a notch on the sliding element, and wherein the door forms a ramp upon insertion of a refueling nozzle such that continued insertion of the refueling nozzle pushes the sliding element from the second position to the first position.

6. The assembly of claim 1, further comprising:
    a projection that extends from the door; and a cam surface that extends from the sliding element, wherein the projection contacts the cam surface when the door is opened to move the sliding element to the first position.

7. The assembly of claim 1, wherein the sliding element is adapted to cooperate with an auxiliary element that is operable with the sliding element.

8. The assembly of claim 1, wherein the sliding member is movable in a direction transverse to the filler tube.

9. The assembly of claim 1, further comprising a pair of projections that are spaced to accommodate one of a diesel fuel nozzle and an unleaded fuel nozzle and to not accommodate the other of the diesel fuel nozzle and the unleaded fuel nozzle.

10. A capless closure assembly for a fuel tank filler tube, comprising;
a housing adapted for covering a bulkhead with an opening disposed on a proximal end of the filler tube;
a sliding element disposed in the housing, wherein the sliding element is movable in a linear, non-rotating fashion between a first position that exposes the opening in the bulkhead and a second position that covers the opening in the bulkhead; and
a door that is biased to close an aperture in the housing, wherein the door cooperates with the sliding element as the door rotates to an open position to move the sliding element from the second position to the first position.

11. A capless closure system for a fuel tank filler tube, comprising;
a bulkhead having an opening, the bulkhead being disposed on a proximal end of the bulkhead;
a housing covering the bulkhead, the housing having an aperture that is aligned with the opening;
a sliding element disposed in the housing and having a hole and a cam surface, wherein the sliding element is movable in a linear, non-rotating fashion between a first position that aligns the hole in the sliding element with the aperture in the bulkhead and a second position that offsets the hole in the sliding element with the aperture in the bulkhead; and
a door that is biased to close an aperture in the housing, wherein the door cooperates with the sliding element as the door rotates to the open position to move the sliding element from the second position to the first position.

12. The system of claim 11, further comprising a projection on the door that cooperates with the sliding element.

13. The system of claim 11, further comprising a cam surface on the sliding element that cooperates with the door.

14. The system of claim 11, further comprising:
a projection that extends from the door; and
a cam surface that extends from the sliding element, wherein the projection contacts the cam surface when the door is opened to move the sliding element to the first position.

15. The system of claim 11, further comprising a cam surface on the sliding element, wherein the cam surface cooperates with the door cooperates with the door.

16. The system of claim 15, wherein the door is connected to the sliding element and the cam surface is a notch on the sliding element, and wherein the door forms a ramp upon insertion of a refueling nozzle such that continued insertion of the refueling nozzle pushes the sliding element from the second position to the first position.

17. The system of claim 11, further comprising an auxiliary element that is disposed below the bulkhead, wherein at least one of the auxiliary element and the sliding element extends through the bulkhead such that the auxiliary element cooperates with the sliding element to carry out an auxiliary function.

\* \* \* \* \*